March 27, 1962 F. S. BOXALL ET AL 3,027,522

DOUBLE BALANCED TRANSISTOR MODULATOR

Filed June 23, 1958 2 Sheets-Sheet 1

FRANK S. BOXALL
MAX D. ROSENSTEIN
INVENTORS

BY

Lippincott, Smith & Ralls
ATTORNEYS

March 27, 1962 F. S. BOXALL ET AL 3,027,522

DOUBLE BALANCED TRANSISTOR MODULATOR

Filed June 23, 1958 2 Sheets-Sheet 2

FRANK S. BOXALL
MAX D. ROSENSTEIN
INVENTORS

BY

Lippincott, Smith & Ralls
ATTORNEYS 3,027,522

DOUBLE BALANCED TRANSISTOR MODULATOR

Frank S. Boxall, Palo Alto, and Max D. Rosenstein, Mountain View, Calif., assignors to Lenkurt Electric Co., Inc., San Carlos, Calif., a corporation of Delaware Filed June 23, 1958, Ser. No. 743,750
10 Claims. (Cl. 332—44)

This invention relates to double balanced modulators adapted particularly to the modulation and demodulation of the signals employed in carrier telephone systems, although it is not restricted to such use and can be employed in many situations where carrier suppressed or single sideband signals are required to be modulated or demodulated.

In many applications wherein modulators (including in this term demodulators) are required it has become almost universal practice to use ring modulators or, as they are sometimes termed, bridge modulators, employing crystal diodes. One of the primary advantages of such modulators is that they are double balanced; i.e., the frequencies applied at their two inputs are substantially cancelled out in their output circuits so that a minimum of difficulty is encountered in designing filters that will separate the undesired from the desired modulation products. The degree to which cancellation of the undesired frequencies is achieved depends primarily upon how nearly identical are the diodes or rectifiers used in their characteristic parameters. As crystal diodes, as now manufactured, vary quite widely in their characteristics, matching those used in any specific amplifier requires very careful selection from those available.

Of the undesired frequencies resulting from unbalance in the circuit elements, the most troublesome is the carrier frequency itself. Double-balanced modulators are most frequently used in single sideband systems. The double-balanced modulator develops, among its modulation products, the second order products $f+F$ and $f-F$; of which only one is desired, $f$ representing carrier frequency and F the signal frequency. The carrier frequency $f$ lies midway between the two sideband frequencies; if it is to be removed, it requires extremely sharp filters to avoid clipping the desired sideband.

The modulator of this invention is applicable in any situation where diode ring or bridge modulators would normally be employed, it being possible to substitute modulators of the type here disclosed for such ring modulators with only minor changes in the circuitry external to the modulator itself.

Among the objects of the invention are to provide a double-balanced modulator wherein the so-called "carrier leakage" is exceptionally low; to provide a modulator having a very low insertion loss in the circuits wherein it is employed; to provide a modulator that does not require that the active modulating elements used (i.e., the transistors) be accurately matched in order to achieve low carrier leakage and otherwise satisfactory operation; to provide a modulator of the character described wherein the undesired modulation products developed in the operation are widely spaced in frequency from the desired modulation components, resulting in relatively easy filtering of the desired from the undesired components; to provide a modulator wherein certain of the undesired modulation products are to a large extent balanced out, and to provide a modulator that operates to give the results mentioned without the complications sometimes introduced by the necessity of providing bias voltages.

The modulator of the present invention may also be considered as a bridge circuit, although its configuration is quite different from that of the conventional ring modulator. In the present device one pair of adjacent arms of the bridge are preferably the two halves of a center tapped winding, which is conveniently one winding of a transformer. The other pair of adjacent arms are a pair of transistors, having their emitter-collector circuits connected in series to form the arms of the bridge. A carrier current source connects to a point between the two transistors and to the two bases thereof in such fashion as to render one of the transistors conductive and to cut off the other and render it substantially nonconductive on one half of the carrier cycle, the two transistors alternating between the conductive and non-conductive state with each reversal of carrier frequency potential. The transistors used may be either of the same conductive type—both NPN or both PNP—or they may be of opposite types, one being NPN and the other PNP; if both are of the same type the terminals of the source are connected respectively to the two bases and a neutral connection from the source is connected between the transistors; if the transistors are of opposite types one terminal of the source connects between the transistors and connections from the other terminal go to the respective transistor bases. The signal source and the load are coupled, respectively, across the two diagonals of the bridge, the load circuit being coupled across that diagonal of the bridge wherein the base current flows in the same direction through it irrespective of which transistor is in the conducting state; thus, if transistors of like conductive type are used the load circuit is connected between the points of junction of two similar arms of each pair while if opposite conductive types of transistor are used the load circuit connects between the junctions of dissimilar pairs of arms of the bridge. Means are provided for limiting the base current flowing through the conductive transistor, such means taking form of resistors which, preferably, are bridged by condensers as will be described hereinafter. Means may also be provided for equalizing any leakage current through the two transistors when in their nonconductive state and for equalizing the effective resistance in the transistor arms of the bridge when conducting.

The particular advantages exhibited by the modulator of the present invention derive from the fact that a transistor, unlike a vacuum tube, is a bilaterally conductive device; i.e., when a voltage exists across its emitter-collector terminals an NPN transistor will conduct if its base is at a potential positive to either of the other two but will cut off (except for a possible small leakage current) when the base is the most negative of the three terminals. With the PNP transistor, the opposite situation obtains; the transistor will cut off if the most positive potential of the system is applied to the base. The functions of emitter and collector therefore interchange when the voltages across these two terminals are reversed. For convenience of explanation the terms "emitter" and "collector" will be employed in what follows, but it is to be understood that these terms are used for convenience only and that what is termed the "emitter" always functions in one-half of the signal cycle as a "collector."

The operation and advantages of the present invention will be more fully described in what follows, these descriptions being illustrated by the accompanying drawings wherein.

Figure 1:
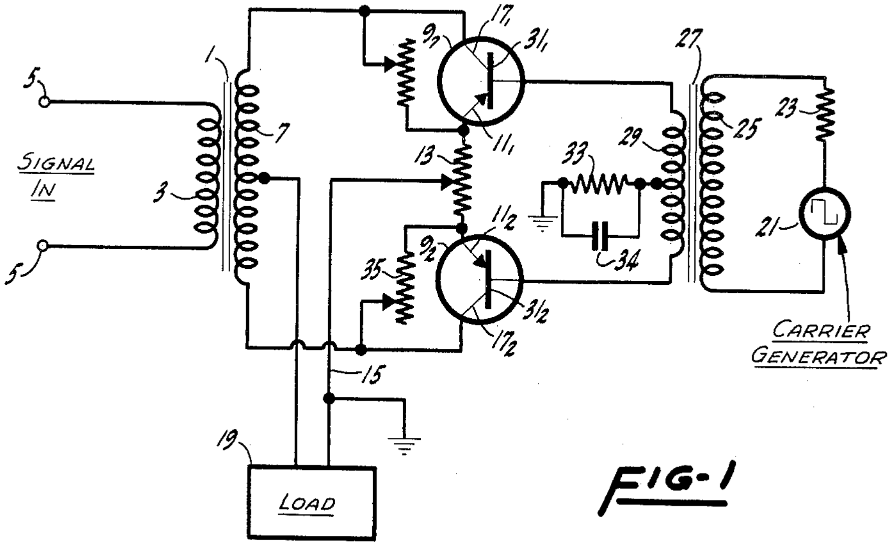
FIG. 1 is a schematic diagram of apparatus employing two similar transistors, in this case both the PNP type.

The arrangement of one form of the present invention is shown schematically in FIG. 1. As far as the modulator circuit itself is concerned, the source of the input signal is a transformer 1, the primary 3 whereof is connected to an input line 5. This transformer has a center tapped secondary 7, which acts as the effective source of modulating current to the active elements of the device. That shown has a 1:1 turn ratio between the primary and entire secondary winding; i.e., a 2:1 ratio between the primary and the winding on each side of the center tap. The two halves of the winding 3 thus form adjacent arms of a bridge circuit the signal being effectively applied across that diagonal of the bridge defined by these adjacent arms in series.

The active modulating elements are a pair of transistors, $\mathbf{9}_1$ and $\mathbf{9}_2$, having the customary emitter, base and collector terminals. The "emitters" $\mathbf{11}_1$ and $\mathbf{11}_2$ may be connected together directly and grounded; in some instances, however, there may be interposed between them a potentiometer 13, of low resistance—preferably in the neighborhood of about 10 ohms—the moving contact of which connects to ground through a lead 15. These two transistors form the other two arms of the bridge circuit.

The "collectors" $\mathbf{17}_1$ and $\mathbf{17}_2$ of the two transistors connect, respectively, to the two terminals of the winding 7 that acts as the signal source. The load, represented by the block 19, connects between the center tap of the secondary winding 7 and neutral or ground; i.e., across the other diagonal of the bridge. As will be shown, only one side of the winding is active at any instant and therefore if the line 5 has an impedance of 600 ohms the load impedance should be 150 ohms for an impedance match.

The carrier frequency on which the signal frequencies are modulated is supplied customarily from a stabilized oscillator, represented schematically as a generator 21 having an internal resistance symbolically represented by the resistor 23. This generator connects to primary winding 25 of a transformer 27. The secondary winding 29 of this transformer is center tapped and its terminals connect to the bases, $\mathbf{31}_1$ and $\mathbf{31}_2$, of the two transistors. A current-limiting resistor 33 connects between the center tap of the secondary winding 29 and ground, and is preferably bridged by a condenser 34. The value of this resistor may be from 5000 to 7500 ohms. The total voltage delivered across the two base terminals is, in this case, about 5 volts.

The figure also shows variable, high value resistors $\mathbf{35}_1$ and $\mathbf{35}_2$ connected across the emitter and collector terminals of each of the two transistors. Together with the potentiometer 13 these resistors serve to balance the circuit so as to make the selection of individual, accurately matched transistors unnecessary. Adjustment of the potentiometer contact 13 serves to balance the currents carried by the two transistors when in the "closed circuit" or conducting condition. Transistors, however, carry current to some degree even when in their nominally cut off, non-conducting condition and resistors $\mathbf{35}_1$ and $\mathbf{35}_2$ are adjusted to make the leakage currents equal. Actually, of course, only one of these resistors is required at any one time, i.e., that across the transistor having higher impedance to reverse voltages. Therefore it is desirable that these resistors be of the type that can be open circuited at the high resistance end.

Like the ring modulator, that of the present invention is of the switching type. To achieve a maximum efficiency the transition from the conducting to the non-conducting state should be as rapid as possible, and therefore it is desirable, although not essential, that the carrier frequency have a square waveform. Rapid switching can also be accomplished by making the amplitude of the carrier large in comparison with that of the signal but this may involve excessive base currents, which, of course, should be avoided. Even where a sine-wave source is used, however, square-wave operation can be approximated by the use of condenser 34, of sufficient size to make its time-constant with resistor 33 long in comparison with the period of the carrier. During conduction this condenser charges to the value of the maximum drop across the resistor and holds both transistors cut off while the carrier voltage is passing through zero.

As will be seen, the circuit has much the general configuration of certain vacuum tube circuits that have been used, for example, as phase discriminators in servo systems, but as will be shown in what follows it possesses important differences in operation owing to the fact that the transistors can conduct in either direction. The transistors shown are of the PNP type, for example, that designated as the 2N123, which is especially designed for switching purposes. In the discussion that follows the polarities mentioned will be those appropriate to PNP transistor, but it will be understood that the NPN type can be used with appropriate changes of polarity.

An important characteristic of the circuit is that no D.C. bias is applied to the collector, the source of all of the currents flowing in the load circuit being the modulating signal itself. Neglecting the very small and undesired leakage current, no current flows in the emitter-collector circuit when the base is positive to the emitter. The transistor offers minimum impedance in its emitter-collector circuit when the base voltage is very nearly equal to that of the collector. Under these circumstances the base current is a maximum, although only a very small fraction of that carried by the load circuit. For maximum efficiency the total carrier voltage developed across the coil 25 should be equal to or very slightly greater than the maximum signal voltage, to insure that on the positive half of the carrier cycle the base will be positive to both the emitter and collector. The resistor 33 should have a value such that on the negative half of the cycle, where conduction to the base occurs, the base current is limited to that corresponding to the load current as supplied from one-half of the signal input transformer secondary 7 at the maximum signal voltage to be expected.

Considering first the operation of one of the transistors, say the transistor $\mathbf{9}_1$, when its collector $\mathbf{17}_1$ is negative to ground and the carrier potential on the base $\mathbf{31}_1$ is also negative, the transistor will, of course, conduct, the collector voltage dropping substantially to that of the base and substantially the entire signal voltage will be developed across the load circuit. Nearly the entire carrier voltage is expended in the drop across resistor 33, so that the center tap of the winding 29 is positive to ground. In a modulator having characteristics described above, the potential developed across the coil 29 is about 5 volts; the base $\mathbf{31}_1$ under this condition is only slightly negative to ground and therefore nearly the entire carrier voltage of 5 volts is impressed in a positive sense on the base $\mathbf{31}_2$ of the other transistor. Since this is, by postulate, positive to both the emitter and collector of transistor $\mathbf{9}_2$ the latter is completely cut off and no load current flows in its half of the circuit.

When the carrier current reverses in the same half of the signal voltage cycle, the "collector" $\mathbf{17}_2$ of transistor $\mathbf{9}_2$ becomes the most positive point in this transistor while its "emitter" $\mathbf{11}_2$ becomes the most negative point. The base $\mathbf{31}_2$ being negative to the collector $\mathbf{17}_2$ the latter now becomes an emitter and the erstwhile emitter $\mathbf{11}_2$ becomes a collector, the transistor now operating in a grounded-collector configuration. Current flowing to the terminal of the now collector $\mathbf{11}_2$ is, as before, limited by the resistor 33 to the same value as before and the base $\mathbf{31}_1$ of transistor $\mathbf{9}_1$ becomes the most positive point in its circuit, cutting off this transistor completely. Current therefore flows in the load circuit on this half of the carrier cycle as well, but it flows in the opposite direction from that obtained when transistor $\mathbf{9}_1$ is conducting. When the signal voltage reverses the action of the two transistors in the two halves of the carrier cycle also reverses.

The resultant current through the load in the two halves of the carrier cycle is very nearly but not quite balanced. When the transistor is acting as first described, with the "emitter" 11 acting as such, the entire current carried by the emitter flows in the load circuit. When the emitter and collector exchange functions the current in the load circuit is the signal current minus the base current of the transistor. Type 2N123 transistor has a ratio of base current to collector current of about 1:50 and therefore, under normal conditions of operation, the difference between the load current on the two halves of the carrier cycle is very small.

It is desirable to limit the base current to the minimum that will pass the maximum signal current to the collector; if it is less than this value it will tend to clip the peaks of the signal, while if it is greater it will absorb too much current on the reverse half of the cycle and cause distortion in minimum signals. If the carrier voltage does not equal the maximum signal voltage complete cutoff will not occur when the base swings positive, resulting in distortion of a different kind. In a circuit designed as described, distortion is in any case very small and only significant under extreme conditions of maximum or minimum load.

Figure 2:
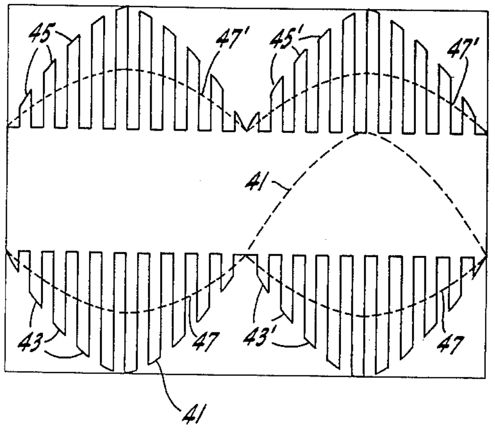
FIG. 2 is a waveform diagram illustrating certain features of the operation of the apparatus shown in FIG. 1.

The result of the operation described is illustrated in somewhat idealized form in the waveforms of FIG. 2, wherein the effect of the small base current is neglected. The various portions of this curve represent what occurs during one cycle of the signal voltage. In this figure the dotted sine curve 41 (lower half of the figure) represents a signal voltage wave, the first half of this curve also defining the envelope of the modulated wave. Current flows in transistor $9_1$ during the half cycle 43 when the base is negative to ground. The modulated waveform traced is that appearing in the load circuit. If the transistors were replaced by vacuum tubes, or if they were so biased as to prevent interchange of function between collector and emitter, transistor $9_1$ would become inactive during the succeeding half cycle and the total current flowing in the load circuit would be that carried by transistor $9_2$ and represented under the succeeding lobe in the lower envelope comprising the pulses 43′. Owing to the bilateral conduction of the transistors, however, transistor $9_2$ also carries current on the first half-cycle of the signal wave. This is represented by the pulses 45 in the upper half of the figure. They are out of step with the pulses 43, and they represent current through the load circuit in the opposite direction to that of pulses 43. Similarly, on the second half-cycle, transistor $9_1$ carries current during the pulses designated as 45′.

The waveforms represented by the pulses 43 and 43′ can be resolved into a number of added components, the more important of which are first, a carrier-suppressed, double sideband modulated wave, second, a double-signal-frequency component (including higher harmonics common to a full wave rectified wave) and third, a D.C. component arising from the unidirectional nature of the pulses. Also present although not evident on inspection of the curve are carrier frequency and higher-order modulation products. When the components are added to those developed as a result of the reverse conduction of the transistors, however, both the rectified signal-frequency waves represented by the median curves in the two envelopes designated as 47 and 47′, the D.C. components and the carrier frequency component very nearly cancel out. The desired modulated waves do not cancel out but add. So, also, do some of the higher-order modulation products, but these are of low amplitude as compared to the total power in the signal and are widely spaced from it and easy to filter. To the extent that the undesired components do not cancel out they represent a transmission loss.

Of greater importance from the operational point of view, however, is the question of carrier leak and its exclusion from the load circuit. Any carrier currents flowing in the circuit are derived from the base currents to the two transistors. Assuming that transistor $9_1$ is conducting and remembering that the base in the type of transistor shown is negative to the emitter, there are two paths through which base currents flow. One is from the upper half of the winding 29 through resistor 33 to ground and thence through lead 15, the upper half of potentiometer 13, junction $11_1$ and base $31_1$ back to coil 29. The other path is through lead 15, load 19, the upper half of coil 7 and thence back to base through the junction $17_1$ to coil 29. When the voltage of the carrier reverses and transistor $9_2$ conducts, two similar paths are offered. The flow through the path first described above does not appear in the load. With regard to the second path, the current flow is from the lower half of coil 29, through resistor 33 to ground, thence through load 19 and down through the lower half of coil 7 and so through junction $17_2$ and base $31_2$ back to the source in the coil 29. Note that on both halves of the carrier cycle the conventional direction of flow through the load is from right to left; i.e., the current through the load is full-wave rectified and its fundamental component is not the carrier frequency but double the carrier frequency. In the signal circuit, represented in the bridge by the coil 7, the two halves of the carrier wave flow in opposite directions.

The carrier current is in any event small in comparison with the signal current in normal operation, say from 30 to 40 db down depending on the level of the signal itself. Any carrier component that appears in the load will be that due to unbalance as between the base currents and the two transistors, which is a small part of an already small component. The double-carrier-frequency component that does appear in the load is far removed from the desired frequencies and much less troublesome to filter out. The same energy, however, appears in the other diagonal of the bridge at the carrier frequency. It is evident, therefore, that the signal input circuit and the load circuit are not interchangeable for proper operation.

Figure 3:
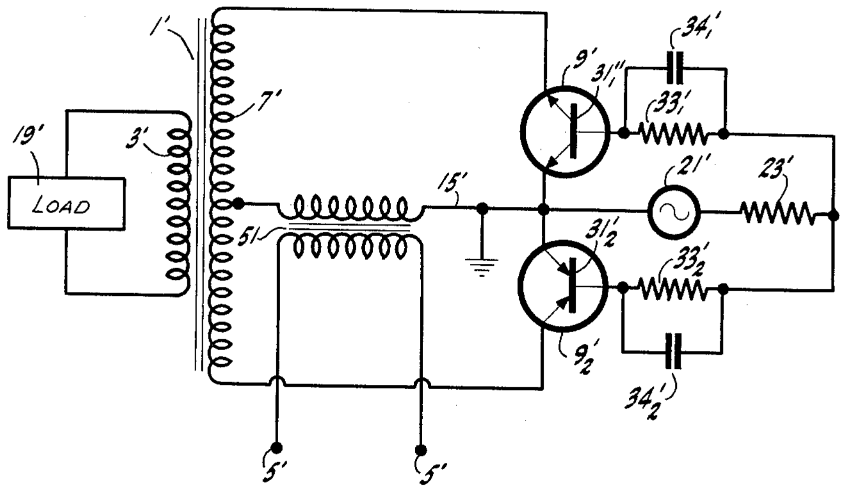
FIG. 3 is a diagram of a device as used with transistors of opposite conductive types.

It should be quite evident that NPN transistors can be substituted for the PNP transistors of FIG. 1 with no other change whatsoever in circuit configuration. FIG. 3 illustrates the changes which permit the same type of operation employing transistors of opposite types.

In FIG. 3 the elements forming the bridge are identified by the same reference characters as those used in FIG. 1 but distinguished by accents. Outside the bridge circuit proper, the elements exercising the same functions as those of FIG. 1 are also distinguished by the same reference characters, accented. It will be noted that in this case the load 19′ is effectively coupled, through coil 3′, with the coil 7′ instead of the signal input circuit being so connected, while the signal input terminals 5′ are coupled across the other diagonal of the bridge through a transformer 51; i.e., the signal source and load circuits are interchanged.

The other major change in the circuit lies in the connections of the carrier source, which, in this instance, is single-ended instead of being coupled into the circuit in push-pull with neutral grounded. One terminal of generator 21′ connects to the junction between the two transistors directly; the other terminal connects to a divided circuit, one branch connects to base $31_1'$ of the NPN transistor through current limiting resistor $33_1'$ bridged by condenser $34_1'$; the other branch connects similarly to the base $31_2'$ of the PNP transistor through current limiting resistor $33_2'$ bridged by condenser $34_2'$.

The two transistors being of opposite types, a potential of the same sign that will cause one of them to conduct will cut the other off. It follows that the base currents or specifically, the portions thereof that flow through diagonal connecting the center tap of coil 7′ with the junction between the two transistors, flow in opposite directions and therefore appear in this diagonal at carrier frequency. Base currents flow in in transistor $9_1'$, pass down the upper half of coil 7' but base currents in the PNP transistor $9_2'$ also flow down through the other half of the same coil. Currents derived from the carrier source as they appear in the base current of the two transistors therefore appear in the load as currents of double carrier-frequency, as in the case of the configuration of FIG. 1, while in the signal circuit they appear as the carrier frequency itself but there do no harm. As in the case of FIG. 1 the advantages of the arrangement are attained only if the load and signal input circuits appear in the proper diagonals of the bridge circuit.

With regard to the other frequencies appearing in the circuits, they are substantially identical to those of FIG. 1 and are illustrated satisfactorily on the waveform diagrams of FIG. 2 and therefore need not be discussed in detail.

In the diagram of FIG. 3 resistors corresponding to the potentiometer 13 and bridging resistors 35 are omitted. If the transistors used are even reasonably well balanced this is generally quite satisfactory; they may similarly be omitted in the form of the device shown in FIG. 1. Even without any compensation offered by these elements there is a much greater latitude of variation possible than with the conventional diode bridge.

What is claimed is as follows:

1. A double-balanced modulator comprising a bridge circuit, one pair of adjacent arms of said bridge circuit comprising a center-tapped transformer winding and the other pair of adjacent arms comprising the emitter-collector circuits of a pair of transistors, a source of carrier frequency current so connected to the bases of said transistors as to alternately cut off current flow through one thereof while rendering the other conducting, a signal input circuit coupled across one diagonal of said bridge circuit, and a load circuit coupled across the other diagonal of said bridge circuit, said load circuit being coupled across that diagonal of said bridge circuit wherein the emitter-base currents through both of said transistors flow in the same direction when said transistors are in the conducting state.

2. A modulator as defined in claim 1 wherein both of said transistors are of the same conductive type, said carrier-current source is connected to apply simultaneously voltages of opposite polarity to the bases of said transistors and said load circuit is connected across the diagonal of said bridge circuit between the center tap of said transformer and the connection between said transistors.

3. A modulator as defined in claim 1 wherein said transistors are of opposite conductive types, said carrier current source is connected to apply simultaneously voltages of the same polarity to the bases of said transistors, and said load circuit is coupled to the diagonal of said bridge circuit across said transformer winding.

4. A modulator as defined in claim 1 including resistance means connected between said source of carrier frequency current and the bases of said transistors for limiting the carrier current to the base of that transistor which is in the conducting state.

5. A modulator as defined in claim 4 including capacitor means connected across said resistor means for maintaining the transistor which has been in the non-conducting state in that condition while the voltage of said carrier current source is at a low value during its reversals of polarity.

6. A modulator as defined in claim 1 including a variable resistor connected across the emitter and collector of at least the one of said transistors exhibiting the lower leakage current when in the non-conducting state for equalizing the leakage currents across said transistors.

7. A double-balanced modulator comprising a pair of transistors each having a base terminal and two other terminals either of which may serve as an emitter terminal, connections from ground to like terminals of each of said transistors, a center-tapped source of signal currents with the terminals thereof connected to the ungrounded terminals of said transistors respectively, a center-tapped source of carrier current, connections from the terminals of said source of carrier current to the base terminals of said transistors respectively, a current-limiting resistor connected from the center tap of said carrier current source to ground, and a load circuit connected between the center tap of said signal current source and ground.

8. A double-balanced modulator comprising a pair of substantially similar transistors with each having a base electrode and second and third electrodes of which either one is capable of acting as the emitter of its respective transistor, connections from each of said second electrodes to a neutral point, means for supplying currents from said third electrode to said neutral point consisting of a center-tapped source of alternating signal currents, a load circuit connected between the center tap of said source and said neutral point, a center-tapped source of carrier current connected between the bases of said transistors and a current-limiting resistor connected between the center tap of said carrier current source and said neutral point.

9. A modulator circuit comprising a pair of like transistors having the emitter-collector circuits thereof connected together at a common junction, a carrier-frequency signal source coupled between the bases of said transistors and said common junction for alternately applying a relatively positive potential to one of said transistors and a negative potential to the other whereby said transistors alternately conduct, a modulating signal source coupled across the two emitter-collector circuits of said transistors, and a load circuit connected between said common junction and said signal source whereby the load signal comprises said carrier signal in a modulating envelope of opposite sidebands defined by the modulating signal.

10. A double-balanced transistor modulator circuit comprising a pair of transistors of like polarity having the emitters thereof connected together at a common junction, a source of carrier-frequency signals, a first transformer having a primary winding connected across said carrier source and a secondary winding connected between the base portions of said transistors, a resistor coupling said common transistor junction with a center tap of the secondary winding of said transformer, a source of modulating signals, a second transformer having a primary winding connected across said modulating source and a secondary winding connected between the collectors of said transistors, and an output circuit connected between the center tap on the secondary winding of said second transformer and said common transistor junction whereby said transistors alternately conduct at the frequency of said carrier signal to pass a modulated signal in alternately opposite directions through said output circuit.

References Cited in the file of this patent

UNITED STATES PATENTS

| | | |
|---|---|---|
| 2,455,732 | Carter | Dec. 7, 1948 |
| 2,780,725 | Johanson | Feb. 5, 1957 |
| 2,799,784 | Harris et al. | July 16, 1957 |
| 2,827,611 | Beck | Mar. 18, 1958 |
| 2,832,051 | Raisbeck | Apr. 22, 1958 |
| 2,862,171 | Freeborn | Nov. 25, 1958 |
| 2,888,622 | Mooers | May 26, 1959 |
| 2,890,418 | Zawels | June 9, 1959 |
| 2,891,156 | Crow | June 16, 1959 |
| 2,907,932 | Patchell | Oct. 6, 1959 |
| 2,943,271 | Willis | June 28, 1960 |
| 2,962,602 | Decker | Nov. 29, 1960 |

FOREIGN PATENTS

| | | |
|---|---|---|
| 1,145,796 | France | May 13, 1957 |